US012748678B2

(12) United States Patent
Coccia

(10) Patent No.: US 12,748,678 B2
(45) Date of Patent: Sep. 29, 2026

(54) METHOD FOR COLLECTION, VALIDATION AND REPORTING OF DATA FOR LARGE-SCALE, ACCURATE, AND SECURE OPEN-SOURCE SOFTWARE AUDITING

(71) Applicant: FOSSITY AUDITING SL, Madrid (ES)

(72) Inventor: Julian Coccia, Benalmadena (ES)

(73) Assignee: FOSSITY AUDITING SL, Madrid (ES)

( * ) Notice: Subject to any disclaimer, the term of this patent is extended or adjusted under 35 U.S.C. 154(b) by 381 days.

(21) Appl. No.: 18/586,877

(22) Filed: Feb. 26, 2024

(65) Prior Publication Data

US 2024/0296106 A1 Sep. 5, 2024

Related U.S. Application Data

(60) Provisional application No. 63/487,629, filed on Mar. 1, 2023.

(51) Int. Cl.
*G06F 11/3604* (2025.01)
*H04L 9/32* (2006.01)

(52) U.S. Cl.
CPC ........ *G06F 11/3604* (2013.01); *H04L 9/3236* (2013.01)

(58) Field of Classification Search
CPC .................................................... G06F 11/3604
See application file for complete search history.

(56) References Cited

U.S. PATENT DOCUMENTS

| | | | | |
|---|---|---|---|---|
| 10,068,093 | B2 * | 9/2018 | Brucker | G06F 11/3604 |
| 10,783,243 | B2 * | 9/2020 | Loch | G06F 12/1416 |
| 11,488,147 | B2 * | 11/2022 | Sheng | G06Q 20/3678 |
| 11,593,492 | B2 * | 2/2023 | Wysopal | G06F 11/3612 |
| 11,727,795 | B1 * | 8/2023 | Shen | G06F 21/6254 382/105 |
| 11,907,378 | B2 * | 2/2024 | Gupta | G06F 21/577 |
| 11,943,369 | B2 * | 3/2024 | Varpiola | G06Q 50/184 |
| 11,949,561 | B2 * | 4/2024 | Randad | H04L 41/0823 |
| 12,265,946 | B2 * | 4/2025 | Duggan | G06F 21/577 |
| 12,579,549 | B2 * | 3/2026 | Berrington | G06Q 30/018 |
| 2013/0031067 | A1 * | 1/2013 | Iyer | G06F 21/64 707/703 |
| 2016/0352744 | A1 * | 12/2016 | Burrows | G06F 21/604 |
| 2017/0017641 | A1 * | 1/2017 | Gidney | G06F 40/289 |
| 2018/0137090 | A1 * | 5/2018 | Duan | G06F 40/30 |
| 2018/0150379 | A1 * | 5/2018 | Ratiu | G06F 11/3608 |
| 2019/0104156 | A1 * | 4/2019 | Barkovic | G06F 16/2477 |
| 2019/0132350 | A1 * | 5/2019 | Smith | G06F 21/60 |
| 2020/0301672 | A1 * | 9/2020 | Li | G06F 11/3698 |

(Continued)

FOREIGN PATENT DOCUMENTS

| | | | | |
|---|---|---|---|---|
| CN | 113886076 A | * | 1/2022 | G06F 11/3604 |
| CN | 119989376 A | * | 5/2025 | |

*Primary Examiner* — Francisco J Aponte
(74) *Attorney, Agent, or Firm* — Defillo & Associates, Inc; Evelyn A. Defillo

(57) ABSTRACT

A method for open-source software auditing, employing a series of steps executed by multiple auditors, acting in isolation, and providing consensus through cross-validation identifications. The method uses a general-purpose computer or microprocessor programmed to perform specific functions of automated software auditory, ensuring a comprehensive evaluation of software components.

11 Claims, 2 Drawing Sheets

Tiered architecture

(56) References Cited

U.S. PATENT DOCUMENTS

| | | | | |
|---|---|---|---|---|
| 2020/0327172 | A1* | 10/2020 | Coquard | G06F 16/9035 |
| 2021/0055927 | A1* | 2/2021 | Sarukkai | G06F 8/71 |
| 2021/0110047 | A1* | 4/2021 | Fang | G06F 16/27 |
| 2022/0067730 | A1* | 3/2022 | Wang | G06Q 20/405 |
| 2022/0138160 | A1* | 5/2022 | Anjum | G06Q 10/103<br>715/272 |
| 2022/0138690 | A1* | 5/2022 | Anjum | G06F 40/131<br>705/80 |
| 2022/0309160 | A1* | 9/2022 | Xiao | G06F 21/562 |
| 2023/0072264 | A1* | 3/2023 | Coccia | G06F 21/44 |
| 2023/0297355 | A1* | 9/2023 | Medicherla | G06F 8/72<br>717/114 |
| 2023/0297558 | A1* | 9/2023 | Kondula | G06F 16/215<br>707/690 |
| 2024/0111875 | A1* | 4/2024 | Stolbikov | G06F 21/577 |
| 2024/0296249 | A1* | 9/2024 | Suga | G06F 21/64 |

* cited by examiner

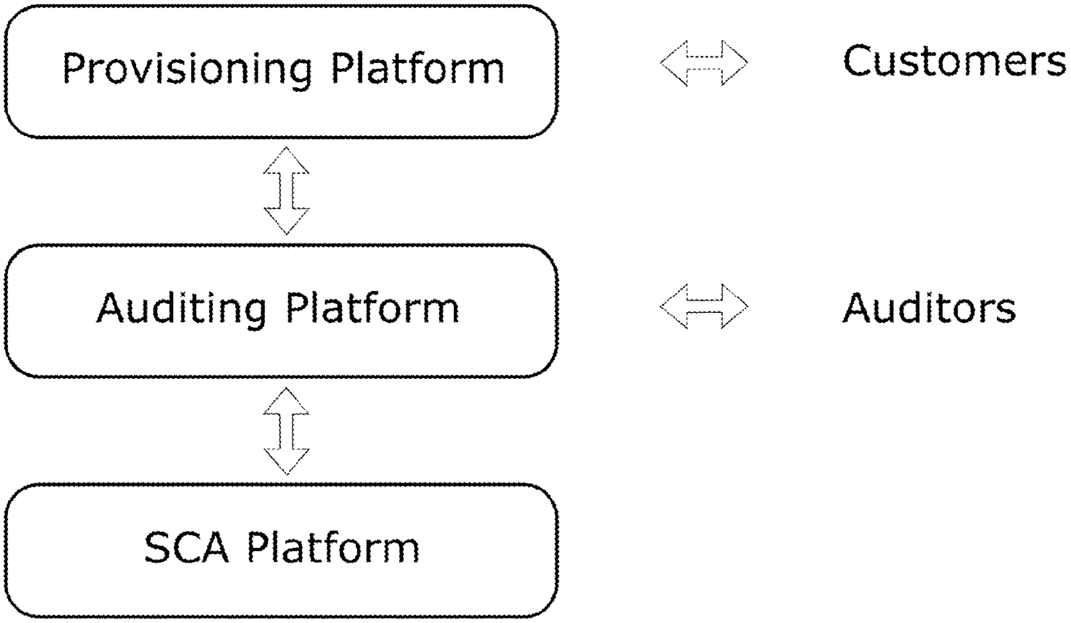
FIG 1. Tiered architecture
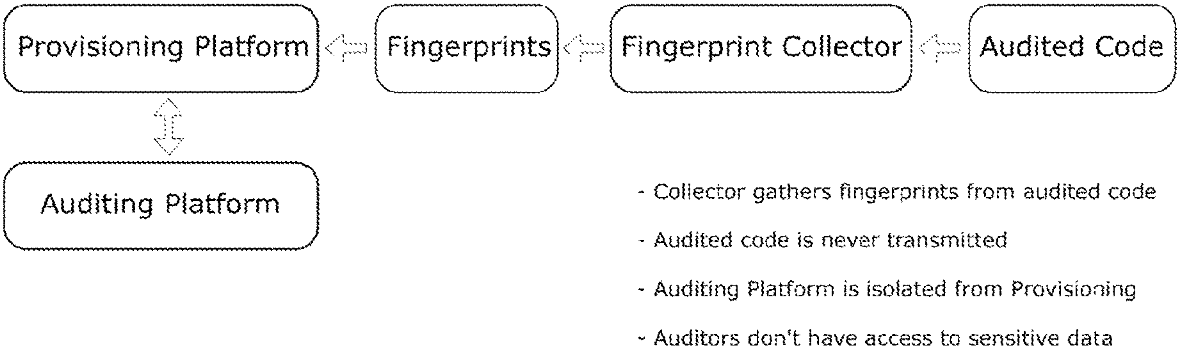
FIG 2. Logical isolation between Provisioning and Auditing platforms

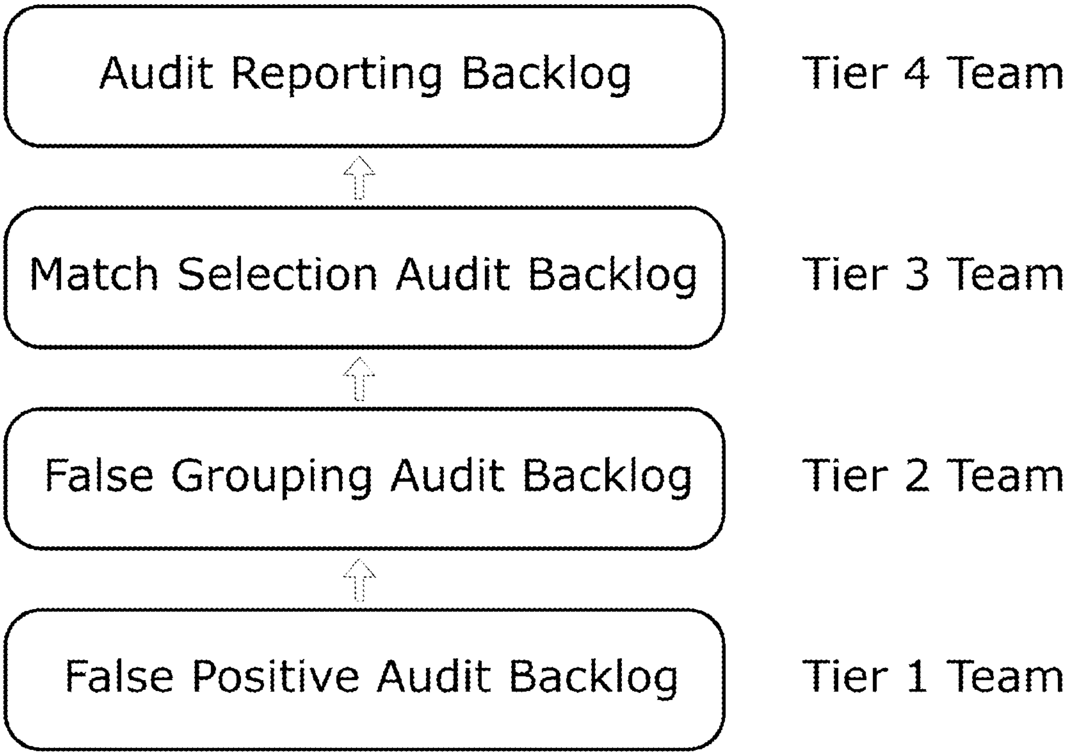
FIG 3. Tiered auditing method
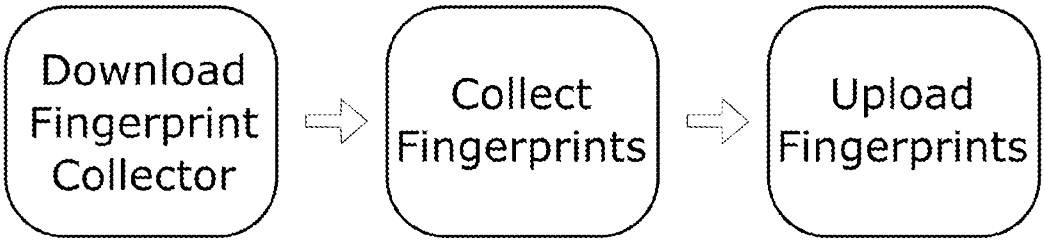
FIG 4. Provisioning process

METHOD FOR COLLECTION, VALIDATION AND REPORTING OF DATA FOR LARGE-SCALE, ACCURATE, AND SECURE OPEN-SOURCE SOFTWARE AUDITING

CROSS-REFERENCE TO RELATED APPLICATIONS

This application claims the benefit of priority to U.S. Provisional Application No. 63/487,629 filed Mar. 1, 2023, the contents of which are incorporated entire herein by reference.

FIELD OF THE INVENTION

The present invention belongs to the technical field of auditing. Particularly to a method for an open-source software auditing.

BACKGROUND OF THE INVENTION

The background of the invention is shaped by the dynamic landscape of open-source software and the evolving need for comprehensive software audits. Open-source software has become integral to numerous organizations, offering accessibility and collaboration. However, this reliance also brings forth challenges, especially regarding legal compliance, absolute confidentiality and the imperative for accurate software assessments.

Traditional software audits have often been manual and resource-intensive, prone to human error, and less efficient in addressing modern software complexities. The background recognizes the pressing need for a more precise, efficient, and confidential approach to open-source software auditing. The Fossity Method responds to these challenges by leveraging innovative technologies and methodologies, including cryptographic hashing for unique code identification, AI assistance for automation, multi-tiered auditing for optimized resource allocation, and a consensus-based approach to minimize human errors.

Additionally, the invention places significant emphasis on data confidentiality, acknowledging the sensitive nature of source code and the associated legal and privacy concerns within software audits. It underscores the importance of securely generating and delivering audit reports while maintaining a clear separation between provisioning and auditing systems to protect the confidentiality of sensitive data. In summary, the background highlights the need to enhance software auditing practices to align with the evolving open-source landscape, emphasizing precision, efficiency, and data confidentiality.

SUMMARY OF THE INVENTION

The invention introduces a pioneering approach to open-source software auditing. This innovative method combines several advanced techniques and methodologies to revolutionize the auditing process.

The process begins with the generation of unique fingerprints for source code files or fragments using cryptographic hashing algorithms. These fingerprints serve as secure and distinct identifiers for tracking and analyzing code components.

Artificial Intelligence (AI) algorithms are seamlessly integrated into the audit process, assisting with tasks such as pre-filtering, automatic voting, and performance validation. This AI support streamlines the audit, enhancing both speed and accuracy.

To ensure precise results and eliminate human error, a consensus-based methodology is employed. Multiple auditors collectively validate identifications.

The invention includes a dynamic database of identifications made by auditors during previous audits. This database serves as a valuable reference, aiding in training, accuracy assessment, focus validation, and AI training.

Meticulous analysis of the compatibility of software licenses associated with identified components is conducted to ensure compliance with legal and regulatory standards.

Detailed audit reports, including executive summaries and findings, are automatically generated and securely delivered, prioritizing data confidentiality throughout the auditing process.

A clear separation between the provisioning, auditing and Software Composition Analysis systems is incorporated to safeguard sensitive data from unauthorized access.

Continuous monitoring of individual auditor accuracy and performance is implemented to maintain high-quality audit results.

Stringent measures are in place to protect the privacy and confidentiality of audited companies and their data throughout the process.

This groundbreaking method addresses traditional challenges in open-source software auditing, offering a comprehensive and efficient means of assessing software components, ensuring legal compliance, and upholding data security. It represents a significant advancement in the field of software auditing, enhancing accuracy, and streamlining processes for auditors and organizations alike.

The method is limited to auditing source code and does not contemplate other types of files like texts or media.

BRIEF DESCRIPTION OF THE DRAWINGS

FIG. 1 presents the tiered, isolated architecture which guarantees increased confidentiality to an exemplifying and non-limiting embodiment of the present disclosure;

FIG. 2 presents the provisioning process to an exemplifying and non-limiting embodiment of the present disclosure;

FIG. 3 presents the breakdown of the logical auditing tiers by skillset to an exemplifying and non-limiting embodiment of the present disclosure; and FIG. 4 presents a simplified process for collection and submission of source code fingerprints to an exemplifying and non-limiting embodiment of the present disclosure.

DETAILED DESCRIPTION OF PREFERRED EMBODIMENTS

The preferred embodiments encompass an innovative approach to open-source software auditing. These embodiments combine several advanced methodologies and technologies to optimize the accuracy, efficiency, and confidentiality of the auditing process.

In these embodiments, the auditing process begins with the generation of unique cryptographic fingerprints for source code files or fragments as shown in FIG. 2. Cryptographic hashing algorithms are utilized to transform the source code into distinct, fixed-size character strings. This ensures that each piece of code is represented by a unique identifier, enhancing the precision of the audit.

These embodiments incorporate AI algorithms into the auditing process. These algorithms play a crucial role in tasks such as pre-filtering, automatic voting, and performance validation. They expedite the audit, identify patterns, and validate findings, contributing to both efficiency and accuracy.

The preferred embodiments employ a multi-tiered auditing structure, as shown in FIG. 3. This tiered approach categorizes auditors based on their expertise and security credentials, ensuring that each facet of the audit is handled by individuals with the most relevant qualifications. This enhances the overall effectiveness of the audit.

These embodiments emphasize a consensus-based methodology to eliminate human error in identification processes. Multiple auditors collectively validate identifications, minimizing the risk of false positives and negatives.

Maintaining a dynamic database of identifications made by auditors during previous audits is a key aspect of these embodiments. This database serves as a valuable reference for training, accuracy assessment, and AI model training. It aids in validating focus areas and improving the AI algorithms used in the audit.

The auditing process in these embodiments meticulously analyzes the compatibility of software licenses associated with identified components. The goal is to facilitate license compliance, minimizing legal risks.

Detailed audit reports, including executive summaries and findings, are automatically generated in a secure manner. These embodiments prioritize data confidentiality throughout the audit process, safeguarding sensitive information.

Emphasis is placed on the separation of the provisioning and auditing systems in these embodiments as shown in FIG. 2 and FIG. 3. This separation enhances data confidentiality by ensuring that sensitive data is not exposed to unauthorized parties.

Individual auditor accuracy and performance are continuously monitored in these embodiments. This monitoring process maintains the high quality of audit results over time and includes an autonomous and dynamic adjustment of auditor voting power based on individual skills and performance, and an automated checkpoint and rollback mechanism to prevent human error.

Stringent measures are in place to protect the privacy and confidentiality of audited companies and their data throughout the auditing process. This includes secure report delivery and data access controls.

These detailed embodiments represent an innovative and comprehensive approach to open-source software auditing. They address traditional challenges associated with manual auditing methods by leveraging advanced technologies and methodologies. This results in enhanced accuracy, efficiency, and data confidentiality, ultimately providing valuable insights and assurance to organizations using open-source software.

The invention claimed is:

1. A process for an open-source software auditing, the method comprising the steps of:

creating a provision platform, an auditing platform, and a composition analysis platform;

in the provision platform, an individual cryptographic fingerprint for each source code file is generated, the cryptographic fingerprint is performed by using cryptographic hashing algorithms;

transforming each one of the source codes into a fixed-size character string;

associating each one of the source code files with the corresponding individual cryptographic fingerprint to ensure that every code element is precisely tracked and identified throughout the auditing process;

in the auditing platform, fingerprints from multiple auditors are collected in a dynamic database;

in the composition analysis platform, the collected fingerprints are compared against an external software composition analysis (SCA) database to find all matches to collectively validate the auditor's identities by using a consensus-based methodology;

identifying false-positives from each automatic identification on the matches;

selecting a common denominator across all matches for a given directory structure;

conducting a compatibility analysis of the common denominator with respective software licenses associated with identified components to ensure compliance with legal and regulatory standards and analyzing possible license incompatibilities;

continuously monitoring each one of the auditors for accuracy and performance to maintain high-quality audit results;

automatically generating detailed audit reports and securely delivering the results to designated recipients, wherein the provisioning platform and the auditing platform operate independently and are not interconnected.

2. The process as claimed in claim 1, wherein said the validation step further comprises:

using artificial intelligence (AI) algorithms into the auditing process, wherein the AI algorithms analyze and categorize the source code data to ensure that the auditing process is focused on pertinent code components, reducing unnecessary overhead, wherein the AI algorithms recognize patterns and make informed decisions and participate in the identification process, wherein the AI algorithms scrutinize audit results, verifying the accuracy of identifications and ensuring the highest standards of precision are maintained.

3. The process as claimed in claim 2, further including the step of:

categorizing the auditors into tiers based on their expertise;

assigning different aspects of the audit to specific tiers: each tier is assigned specific responsibilities within the audit process;

and aligning tasks with auditor qualifications.

4. The process in as claimed in claim 3, wherein:

multiple auditors collaboratively participate in the validation of code identifications.

5. The process as claimed in claim 4, wherein:

the dynamic database catalogs the identifications made by auditors in the course of prior audits;

the dynamic database serves as a reference point for training new auditors;

the dynamic database allows auditors to cross-reference their identifications with those in the database.

6. The process as claimed in claim 1, wherein the process dedicates special attention to the licenses associated with identified code components, each license is subjected to a meticulous scrutiny;

the method ensures that the audited software components comply with legal and regulatory standards, by examining licenses in detail, the audit process seeks to confirm that the use of each component aligns with legal requirements.

7. The process as claimed in claim 1, further including the step of:

generating executive summaries of audit findings.

8. The process as claimed in claim 1, wherein the stringent measures to guarantee that audited companies' data and sensitive information are shielded from unauthorized parties at all times.

9. The process as claimed in claim 1, wherein further including the step of:

continuously monitoring each one of the auditor's accuracy and performance, and continuously monitoring the accuracy and performance of each one of the auditors.

10. The process as claimed in claim 1, wherein a curated annotations database is used for continuous performance assessment of the auditors;

further including an autonomous voting power adjustment system that uses machine learning algorithms and historical audit data to dynamically assess the performance of each auditor;

further including the step of a dynamic adjusting of the auditor voting power, by analyzing each auditor's skills and performance metrics derived from the curated annotations database, the method adapts the voting power assigned to each auditor, ensuring that more proficient auditors have a greater influence on code identifications, wherein the process is free of human intervention or evaluation in adjusting auditor voting.

11. The process as claimed in claim 1, further including the steps of:

presenting auditors with evaluation checkpoints, the evaluation checkpoints are strategically interspersed within the auditing process and are designed to gauge the accuracy of auditor identifications; employing predetermined criteria to evaluate auditor performance at each checkpoint; if an auditor fails to pass a predetermined number of evaluation checkpoints, the system performs an automatic rollback to the last successful checkpoint pass to ensure that only accurate identifications contribute to the final audit results.

* * * * *